United States Patent
AmRhein

(10) Patent No.: US 12,305,730 B2
(45) Date of Patent: May 20, 2025

(54) CRASH ABSORPTION DEVICE

(71) Applicant: Frederick J. AmRhein, Fort Collins, CO (US)

(72) Inventor: Frederick J. AmRhein, Fort Collins, CO (US)

( * ) Notice: Subject to any disclaimer, the term of this patent is extended or adjusted under 35 U.S.C. 154(b) by 85 days.

(21) Appl. No.: 17/826,596

(22) Filed: May 27, 2022

(65) Prior Publication Data

US 2023/0383810 A1 Nov. 30, 2023

(51) Int. Cl.
*F16F 3/02* (2006.01)
*F16F 3/00* (2006.01)

(52) U.S. Cl.
CPC ..................... *F16F 3/02* (2013.01)

(58) Field of Classification Search
CPC ................. F16F 3/00; F16F 3/02; F16F 1/00
USPC ........................................................ 267/143
See application file for complete search history.

(56) References Cited

U.S. PATENT DOCUMENTS

| | | | | |
|---|---|---|---|---|
| 4,231,615 A * | 11/1980 | Griffiths | .................. | A47C 7/32 267/143 |
| 6,505,560 B1 * | 1/2003 | Kamdar | .................. | F42B 5/18 102/431 |
| 2006/0277686 A1 * | 12/2006 | Eigenmann | ............ | A47C 23/04 5/256 |
| 2021/0260458 A1 * | 8/2021 | Shah | .................... | A63B 21/222 |

FOREIGN PATENT DOCUMENTS

| | | | | | |
|---|---|---|---|---|---|
| CN | 107387626 | A | * | 11/2017 | ............. F16F 1/182 |
| CN | 110763174 | B | * | 5/2021 | ............. G01B 21/02 |
| DE | 420943 | C | * | 11/1925 | |
| DE | 102004019701 | A1 | * | 11/2005 | ............. F16F 1/025 |
| GB | 2537501 | A | * | 10/2016 | ............... B60P 1/64 |
| JP | 04025797 | A | * | 1/1992 | |
| RU | 2583404 | C1 | * | 5/2016 | |
| WO | WO-2006015607 | A2 | * | 2/2006 | ............. F16F 1/021 |
| WO | WO-2011107706 | A1 | * | 9/2011 | ............... F16F 1/13 |

* cited by examiner

*Primary Examiner* — Melody M Burch

(74) *Attorney, Agent, or Firm* — Macheledt Bales LLP; Jennifer L. Bales

(57) ABSTRACT

Crash absorption device for absorbing impacting energy, for example for cushioning falls. The crash absorption device may be used with a crash pad, by placing the crash absorption device under the pad. The pad may be secured in place so that it does not slide off the crash absorption. Crash absorption devices are energy absorbing and displacing apparatus typically placed on flooring or the ground beneath a crash pad to protect a falling object or person (for example a rock climber) from destructive impacting forces. Some devices are designed to be disassembled or folded for stowage. Crash absorption devices may include elements that absorb energy via bending, torsion, or both.

21 Claims, 14 Drawing Sheets

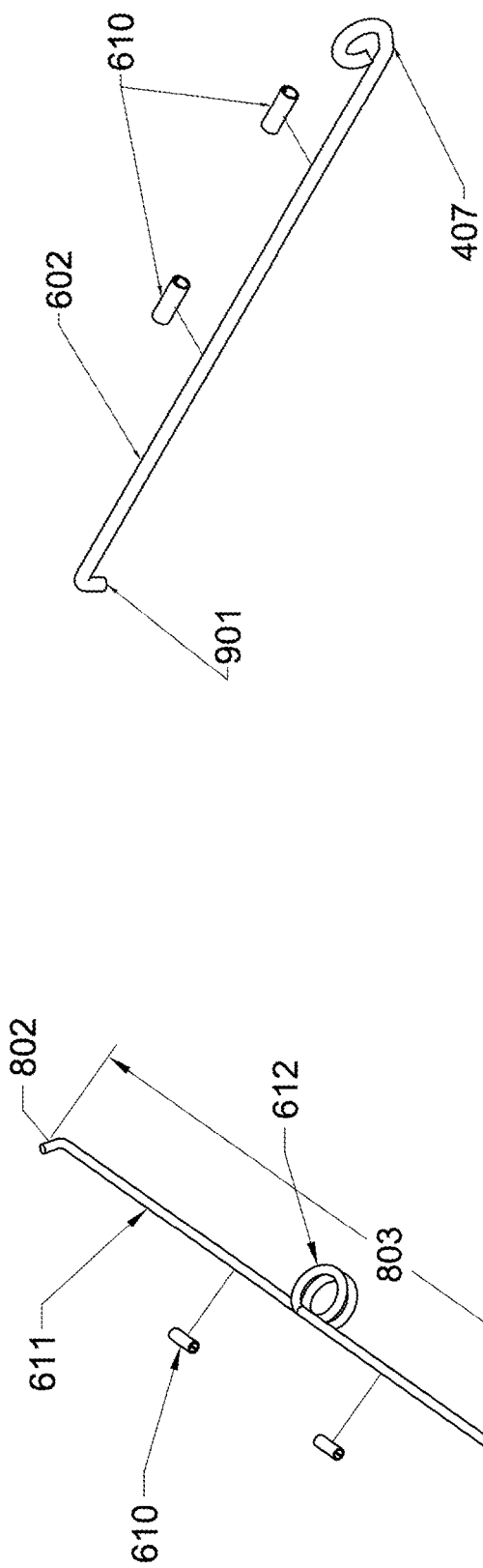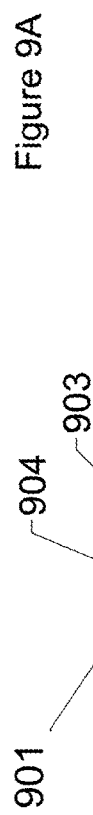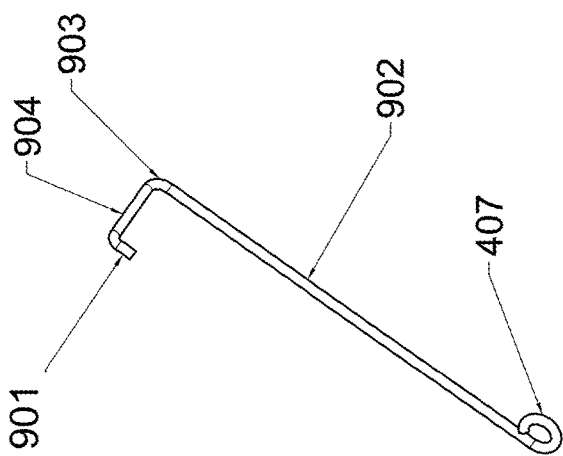

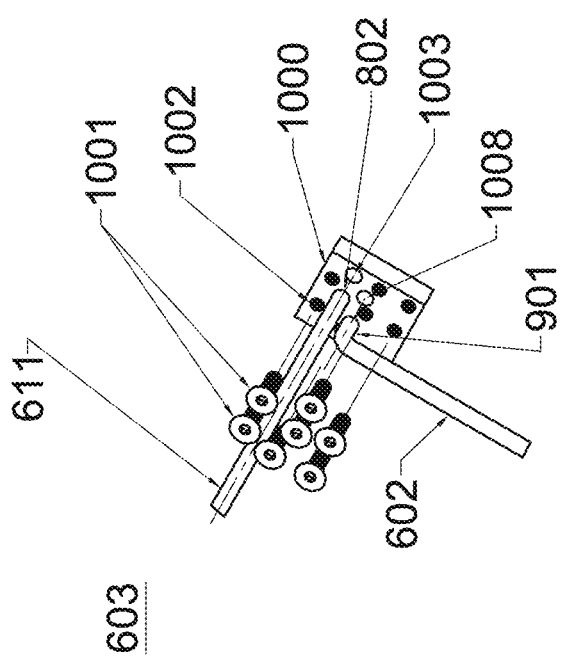
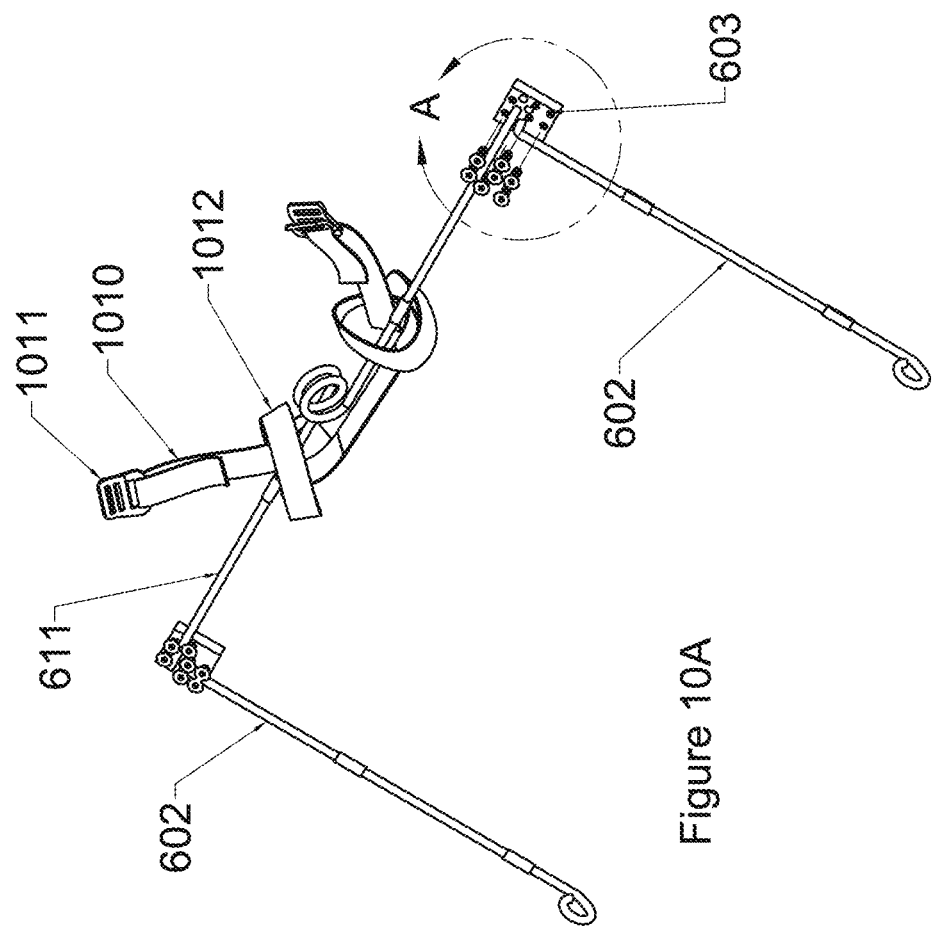
Figure 10B
Figure 10A

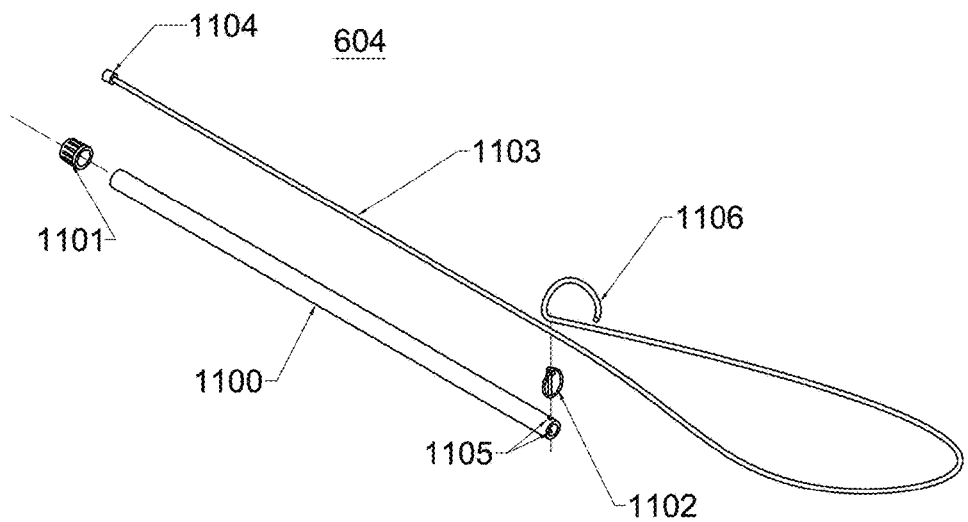
Figure 11
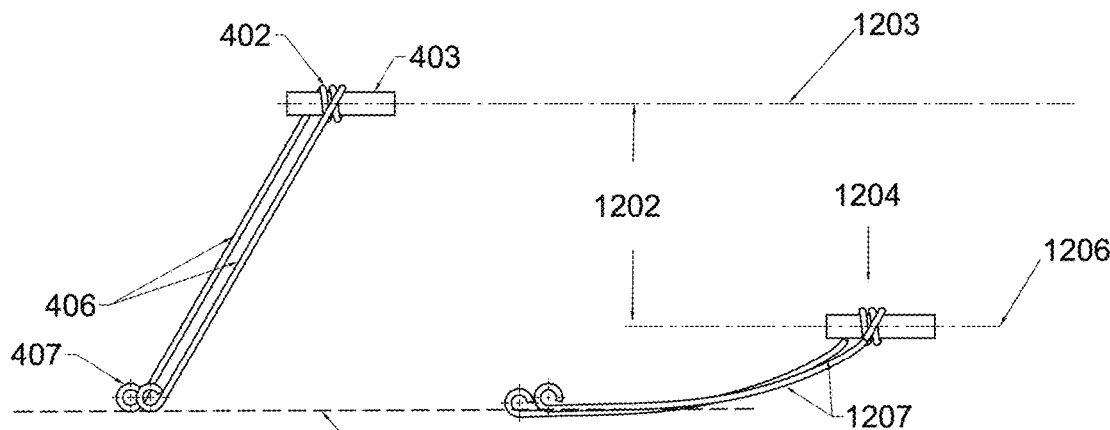
Figure 12A
Figure 12B
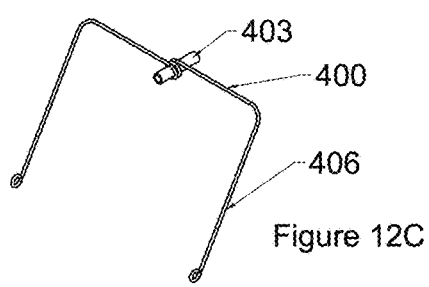
Figure 12C

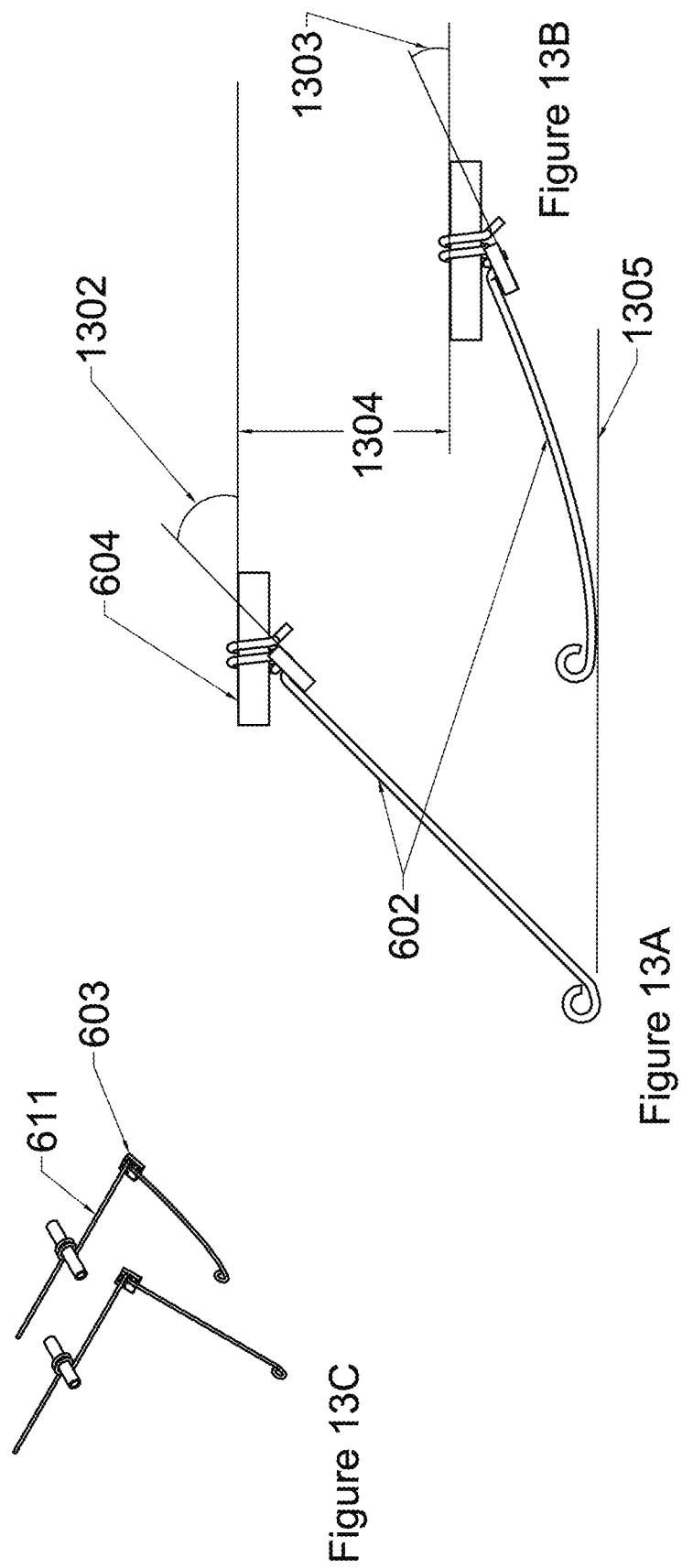

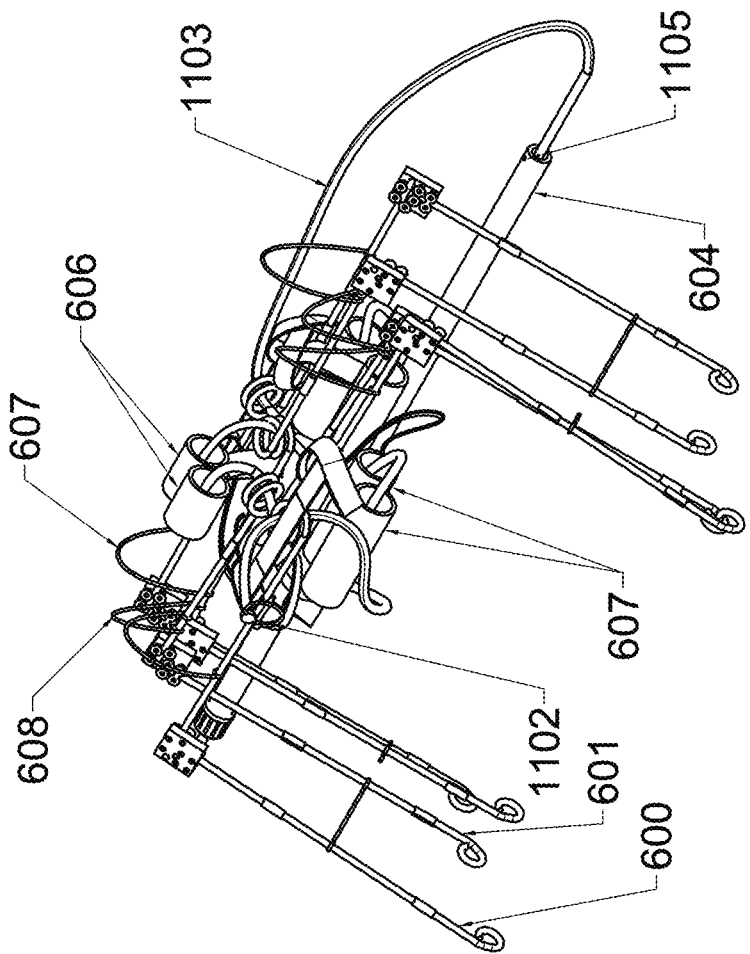
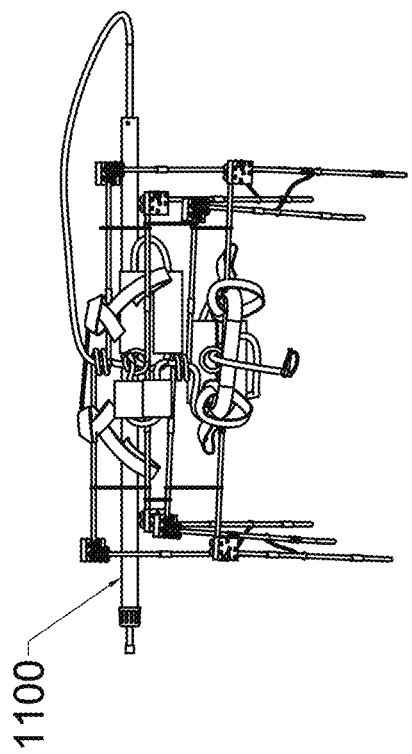
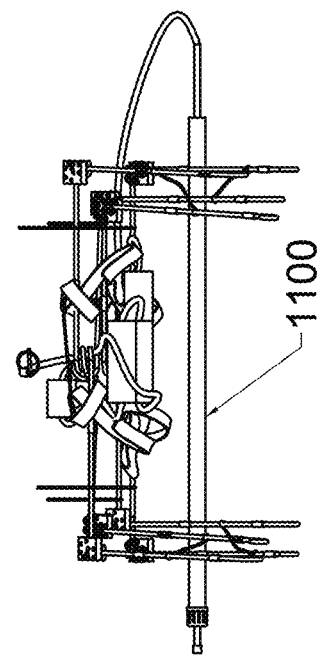
Figure 14A
Figure 14B
Figure 14C

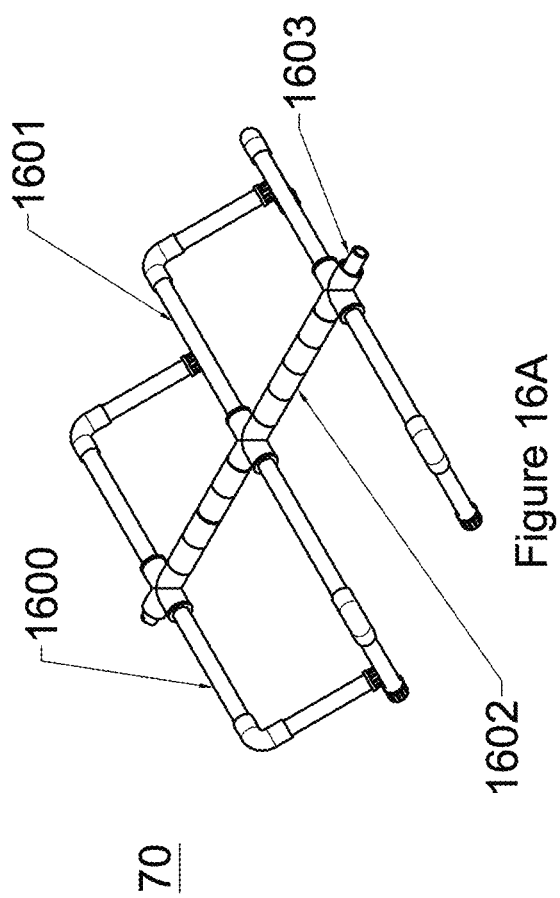
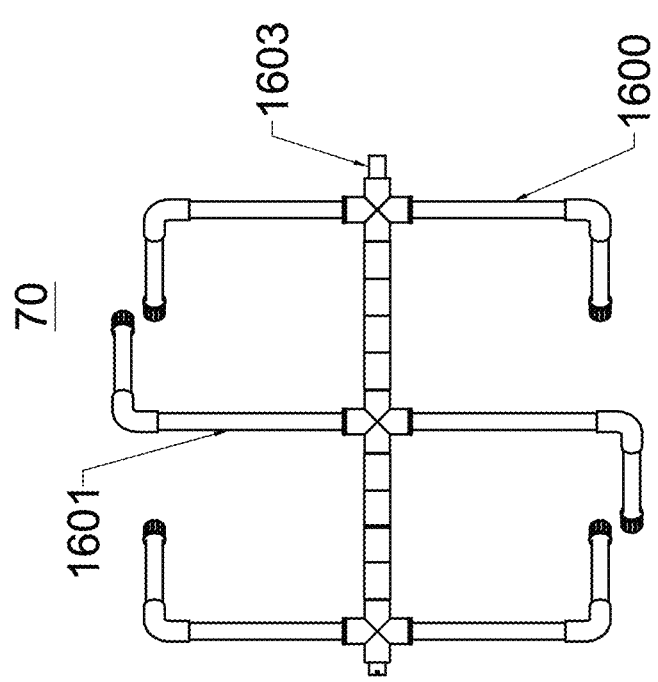
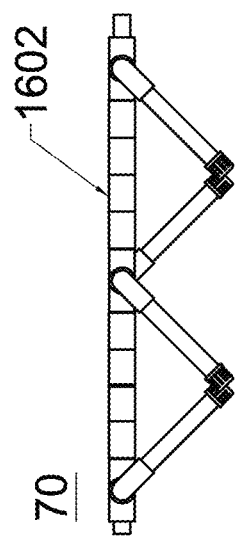
Figure 16A
Figure 16B
Figure 16C

CRASH ABSORPTION DEVICE

BACKGROUND OF THE INVENTION

Field of the Invention

The present invention relates to apparatus for absorbing impacting energy. In particular, the present invention relates to such apparatus for use with crash pads for rock climbing and the like.

Discussion of Related Art

Currently, rock climbers commonly leave crash pads under the area they are climbing, to cushion falls. Climbers might need multiple pads for safety. The pads are heavy and bulky, and slide with respect to each other.

SUMMARY OF THE INVENTION

It is an object of the present invention to provide apparatus (a crash absorption device) for absorbing impacting energy, for example for cushioning falls. The crash absorption device may be used with a crash pad, by placing the crash absorption device under the pad. The pad may be secured in place so that it does not slide off the crash absorption device. Rock climbing crash pads are typically comprised of various layers of foam, both open and closed cell materials encased in a surrounding durable fabric enclosure.

Crash absorption devices are generally energy absorbing and displacing apparatus typically placed on flooring or the ground beneath a crash pad to protect a falling object or person (for example a rock climber) from destructive impacting forces. It may include mechanical elements of various materials and geometries. Some devices are designed to be disassembled and reduced in size into a collapsed configuration. They may be further disassembled and reduced in size into a stowage configuration.

Embodiments of the crash absorption device may include elements that absorb energy via bending, torsion, or both. One embodiment comprises horizontal torsion rods connected to bendable legs that extend downward. The legs may be disposed at an angle and may cross over each other. Four torsion rods each attached to two legs (often crossing over each other) works well. An elongated horizontal transverse support assembly connects the torsion rods. Restraints may be used to stabilize torsion rods with respect to each other, and to stabilize legs where they cross over. Movement limiters restrict displacement and motion of the various elements during assembly, to aid in collapse for transporting, during operation and during longer term stowage of the apparatus in the stowage configuration.

The torsion rods may include helical coils to allow the rods to twist and to bias them back into alignment. The transverse support assembly includes a support rod and a cable inserted through the support arm. Spacers maintain spacing between the torsion rods and the transverse support assembly inserts through the spacers and the helical coils.

An embodiment is capable of being collapsed and folded into a generally flat collapsed configuration for travel. To fold the crash absorption device into the collapsed configuration, the support rod is slid out of and removed from the spacers and the helical coils. The cable remains positioned through the spacers and the helical coils and is given enough slack that the spacers fold with respect to each other while the legs fold onto one another as a stack. Assembling the crash absorption device for use is done in reverse: the support rod is re-inserted through the spacers and the helical coils and slack in the cable is taken up. The device may be further broken down to a stowed configuration for airplane travel and the like.

A transverse rod cap attaches to the support rod, also at the distal end. This cap has a clearance hole through which the cord is inserted. A cord end stop (for example a knot) is disposed at the distal end of the of the crash absorption device's support rod to keep the cable running through the cap, transverse support, spacers, and the torsion/bend assemblage. A retaining device such as a lock pin may be attached to the opposite end of the cord. This pin, when inserted through clearance holes, can be used at the proximate end of the transverse support assembly to hold the support rod in place and keep the torsion/bend elements and couplers from coming off of the transverse support. bend/torsion elements and spacers. (to keep the support rod from un-inserting).

BRIEF DESCRIPTION OF THE DRAWINGS

FIG. 8 is a schematic isometric diagram showing a torsion element from FIG. 6A in more detail.

FIG. 9A is a schematic isometric diagram showing a bend element from FIG. 6A in more detail. FIG. 9B is a schematic isometric diagram showing an alternate bend element.

FIG. 10A is a schematic isometric diagram showing joint assemblies from FIG. 6A in use. FIG. 10B shows a joint assembly in more detail.

FIG. 11 is a schematic isometric diagram showing a transverse support assembly from FIG. 6A in more detail.

FIG. 12A is a side view illustrating integral bending elements in their unbent position. FIG. 12B. is a side view illustrating integral bending elements in their bent position. FIG. 12C is an isometric view showing integral bending elements in their unbent position.

FIG. 13A is a side view illustrating connected bend assemblies in their unbent position. FIG. 13B is a side view illustrating connected bend assemblies in their bent position. FIG. 13C is an isometric view illustrating connected bend assemblies in their unbent position FIG. 14A is an isometric view of a crash absorption device in a collapsed configuration. FIG. 14B is a view of the collapsed configuration from the top. FIG. 14C is a view of the collapsed configuration from the end

FIG. 16A is a schematic isometric diagram of a crash absorption device having a dogleg design and two torsion rod assemblies connected to bendable legs. FIG. 16B is a top view of the device in FIG. 16A. FIG. 16C is a side view of the device in FIG. 16A.

DETAILED DESCRIPTION OF THE INVENTION

TABLE 1

Figure 1A:
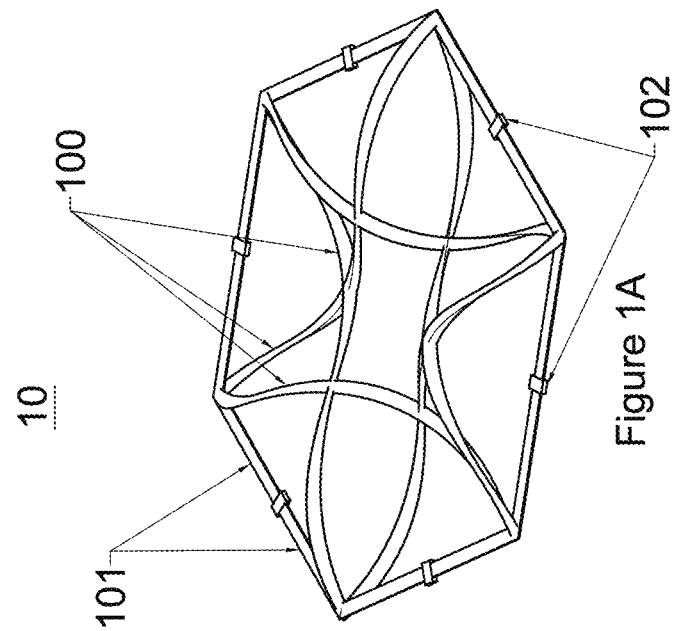
FIG. 1A is a top isometric view of a crash absorption device having a helical design.

| Ref. No. | Element |
| --- | --- |
| 10 | Helical crash absorption device |
| 20, 30 | Dogleg crash absorption devices |
| 40, 50, 60 | Torsion rod-bendable leg crash absorption devices |
| 100 | Helical Component |
| 101 | Flexible Cordage |
| 102 | Cordage connector (detachable buckle) |
| 200 | Long torsion and bend assembly |
| 201 | Short torsion and bend assembly |
| 202 | Dogleg torsion and bend assembly |
| 203 | Transverse support assembly |
| 204 | Bend element |
| 205 | Long torsion element |
| 206 | Short torsion element |
| 207 | Dogleg torsion element |
| 208 | Cross fitting |
| 209 | Removable tee |
| 300 | Long torsion and bend assembly |
| 301 | Short torsion and bend assembly |
| 302 | Dogleg torsion and bend assembly |
| 303 | Transverse support assembly |
| 304 | Bend element |
| 305 | Long spacer |
| 306 | Short spacer |
| 307 | Permanent cap |
| 308 | Removable pin |
| 309 | Cross fitting |
| 400 | Long unitary torsion and bend assembly |
| 401 | Short unitary torsion and bend assembly |
| 402 | Double coil |
| 403 | Transverse support |
| 404 | Torsion element |
| 405 | 90-degree bend |
| 406 | Bend element |
| 407 | End treatment |
| 408 | Long spacer |
| 409 | Short spacer |
| 410 | Removable pin |
| 500 | Long divided torsion and bend assembly |
| 501 | Short divided torsion and bend assembly |
| 502 | Block |
| 503 | Long torsion element |
| 504 | Bend element |
| 505 | 90-degree bend |
| 506 | End treatment |
| 507 | Short torsion element |
| 508 | Transverse support assembly |
| 600 | Long connected torsion and bend assembly |
| 601 | Short connected torsion and bend assembly |
| 602 | Bend element |
| 603 | Elbow joint |
| 604 | Transverse support assembly |
| 605 | Long spacer |
| 606 | Short spacer |
| 607 | Restraint between long and short torsion elements |
| 608 | Restraint between short torsion elements |

TABLE 1-continued

| Ref. No. | Element |
| --- | --- |
| 609 | Restraint between bend elements |
| 610 | Movement limiter |
| 611 | Torsion element |
| 612 | Double coil |
| 802 | Stub |
| 803 | Torsion element length |
| 901 | Stub |
| 902 | Bend element with integral elbow |
| 903 | Integral elbow |
| 1000 | Elbow joint plate |
| 1001 | Fastener |
| 1002 | Fastener hole |
| 1003 | Torsion element assembly stub clearance hole |
| 1008 | Bend element assembly stub clearance hole |
| 1009 | Joint plate |
| 1010 | Attaching flexible cord |
| 1011 | Attaching buckle |
| 1012 | Overhand knot |
| 1100 | Transverse support rod |
| 1101 | End cap |
| 1102 | Removable pin |
| 1103 | Flexible cord |
| 1104 | Cord end treatment |
| 1105 | Pin clearance holes |
| 1106 | Cord end loop |
| 1202 | Deflection delta |
| 1203 | Starting height |
| 1204 | Applied load |
| 1205 | Ground level |
| 1206 | End height |
| 1207 | Integral bend assemblies in deflected positions |
| 1302 | Initial angle |
| 1303 | Final angle |
| 1304 | Vertical deflection of assembly |
| 1305 | Ground level |
| 1600 | Torsion and Bend Assembly |
| 1601 | Dogleg Torsion and Bend Assembly |
| 1602 | Spacer |
| 1603 | Transverse Support |

Table 1 shows elements of crash absorption devices along with their associated references numbers.

FIG. 1A is a top isometric view of helical resilient energy absorbing and displacement design (helical design) 10 comprising three (3) main components; six helically shaped components 100, six flexible cordage 101 connecting the helical components 100 at the point where they meet further terminated at each end with a connector, and six flexible cordage connectors 102, typically a buckle.

Figure 1C:
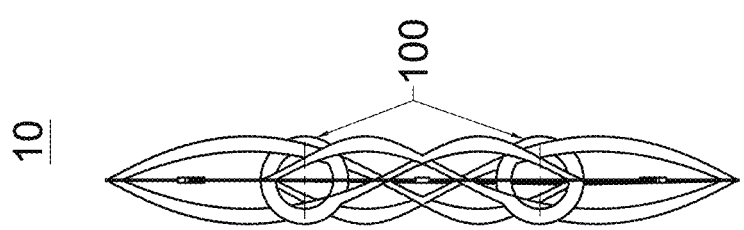
FIG. 1C is side view of the device of FIG. 1A.
Figure 1B:
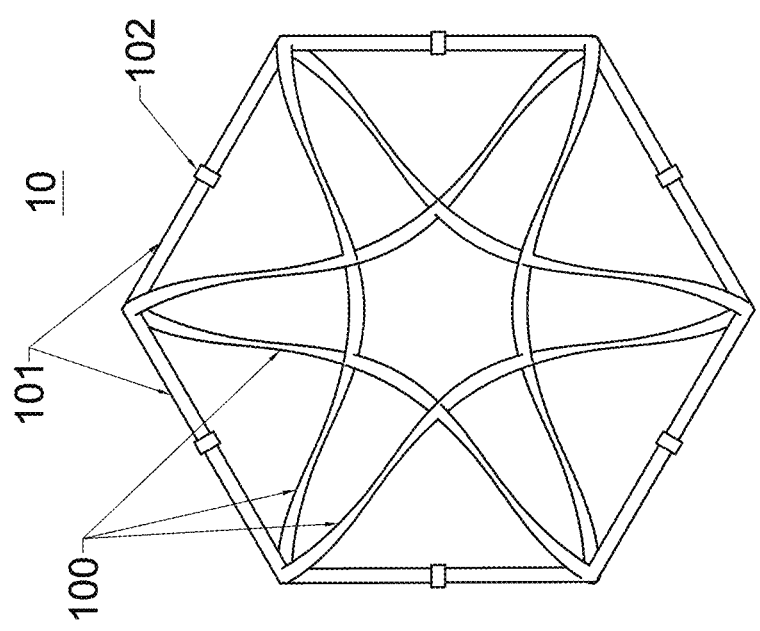
FIG. 1B is a top view of the device of FIG. 1A.

FIG. 1B is a top view of helical design 10. FIG. 1C is a side view which provides a view down the longitudinal axes of two helical components 100 providing a view of the circular geometry down their longitudinal axes.

Figure 1D:
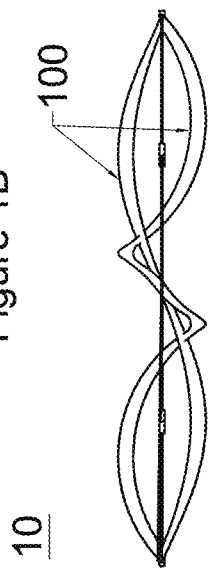
FIG. 1D is a side view of elements of the device of FIG. 1A.

FIG. 1D is a side view perpendicular to the longitudinal axes of two helical components 100 providing a view of the sinusoidal geometry of those components FIGS. 1A-1D show crash absorption device 10 having a helical design. Crash absorption device 10 comprises two pairs of three helical rods/tubes 100 arranged as shown in FIG. 1A. In one example, the circular feature shown in FIG. 1C has an internal diameter of approximately 6". The three rod/tubes 100 of each pair are flexibly connected at the ends (connections not shown) and can be disconnected and rearranged to a reduced size for stowage.

When a force is applied in the approximately vertical direction to device 10, the helical elements 100 react in bending (deflection of the circular geometry) and resulting torsion in the helix. As such, the helical design is both a bend and torsion mechanical device. The helical components are typically comprised of PVC tube material, typically Schedule 40, ¾".

FIGS. 2A-2D show a crash absorption device 20 having a dogleg design. The legs are angled obliquely down.

Device 20 comprises horizontal torsion elements and obliquely situated bend elements. FIGS. 2A-2D depict a design that incorporates torsion and bend element assemblies 200, 201, and 202 as well as a removable transverse support assembly 203. The design has a similar resilient characteristic as the helical design yet further refines stability due to the support of the structure at the terminating ends of the bend elements 204 as designed to coincide closely with the rectangular configuration of most bouldering pads and a simplified assembling process with the orthogonal transverse support assembly 203. Similar to the helical design, the components are primarily of tubular geometry of PVC material.

This design includes five (5) torsion and bend assemblies 200, 201, and 202, each comprising a torsion element 205, 206, 207.

There are two long torsion and bend assemblies 200 on each end of device 20, two short torsion and bend assemblies 201 inside of bend assemblies 200, and one dogleg torsion and bend assembly 202 in the center.

Torsion and bend assemblies 201 are similar to torsion and bend assemblies 200 except that torsion and bend assemblies 200 have a longer torsion element 205, and torsion and bend assemblies 201 have a shorter torsion element 206. Bend elements 204 attached to the torsion elements on both 200 and 201 are at an approximately 45-degree angle relative to the axis of the torsion elements. The bend elements 204 are assembled additionally so that they angle down approximately 45 degrees from the longitudinal axis of the transverse support.

The dogleg torsion and bend assembly 202 differs from torsion and bend assemblies 200 and 201 in several ways. The dogleg torsion element 207 is longer to allow its bend elements 204 to angle from torsion element 205 axis by 90-degrees rather than 45-degrees.

Each of the ten (10) torsion elements 205, 206, 207, two per each torsion and bend assembly 200, 201, and 202, is in general permanently attached to a cross fitting 208. For example, torsion elements 205, 206, 207 may be glued to their respective cross fitting 208.

The transverse support assembly 203 can be inserted and removed from the orthogonally located clearance holes in cross fittings 208 due to its smaller outer diameter compared to the inner diameter of the cross fitting 208.

Since the torsion elements 205, 206, 207 are permanently attached to cross fittings 208 they are restricted to rotate (twist) about their longitudinal axes. Thus, when the transverse support assembly 203 is inserted through the crosses 208 and a load is applied vertically onto the top of device 20, torsion elements 205, 206, 207 twist. When the load is removed, torsion elements 205, 206, 207 untwist nearly to their original configuration. Similarly, bend elements 204 bend under load and unbend when the load is removed.

When a force is applied in the approximate vertical direction onto the assembled Device 20 apparatus, the reactive forces at the ground ends of the bend elements (legs) 204 create stresses in the legs such that the element 204 goes into the mechanical state of bending. At the same time, due to the moment arm length of the obliquely situated legs, these same reactive forces create a mechanical moment about the point where the bend and torsion elements meet. This moment forces the torsion element to rotate about its longitudinal axis and thus this element goes into a state of mechanical torsion.

Those skilled in the art will appreciate that torsion elements 205, 206, 207 do bend slightly, bend elements 204 do twist slightly, and device 20 does return to precisely its original configuration. However, the majority of force absorbed by the torsion element is generally by torsion and the majority of force absorbed by the bend elements is generally absorbed by bending. In general, far more of the force of the load is absorbed by torsion than by bending. For example, 80% or more of the force load may be absorbed by torsion. As long as the materials stay within their elastic regions, the device will return to its unloaded configuration before the load was applied, once the load was removed.

In general, the elastic limits of the material are not quite reached, so the devices spring back to their unloaded configuration when the load is removed. A small amount of deformation may remain—for example a few percent of the original height might be lost. This is a matter of design based on dimensions and material properties.

A removable tee 209 on the end of transverse support assembly 203 may be used so that transverse support assembly 203 can be removed (un-inserted) from each cross fitting 208 to collapse device 20.

Figure 3:
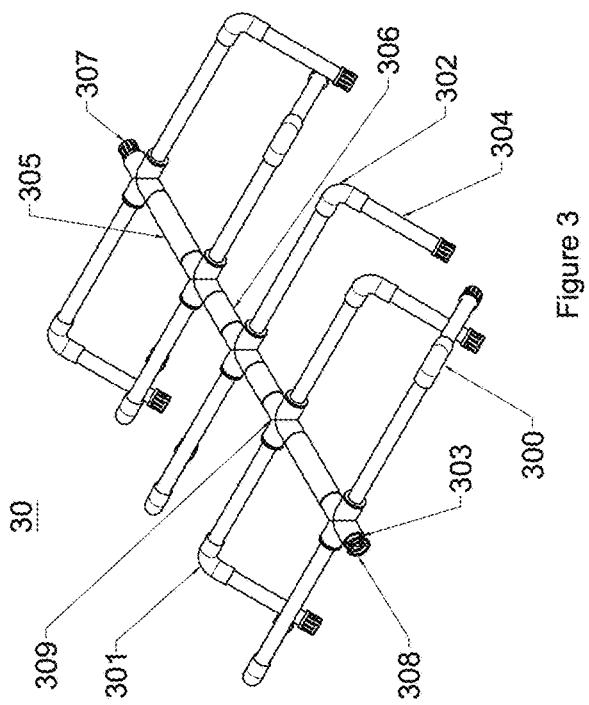
FIG. 3 is a schematic isometric diagram of another crash absorption device having a dogleg design.
Figure 2C:
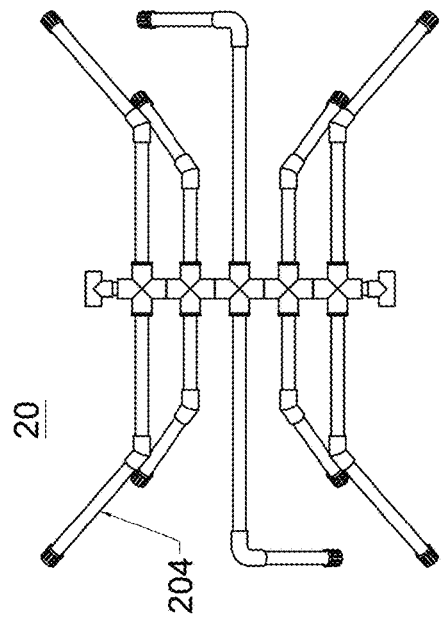
FIG. 2C is a top view of the device of FIG. 2A.
Figure 2A:
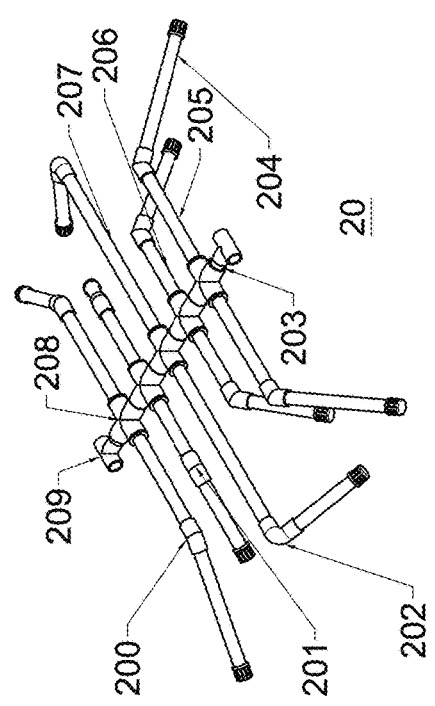
FIG. 2A is a schematic isometric diagram of a crash absorption device having a dogleg design.
Figure 2B:
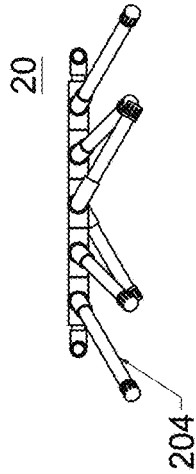
FIG. 2B is a side view of the device of FIG. 2A.

FIG. 3 is a schematic block diagram of another crash absorption device 30 having bend elements 304 angled obliquely down from transverse support assembly 303. Bend elements 304 are at a 90° angle from their torsion elements. Crash absorption device 30 includes a dogleg torsion and bend assembly 302 as the 3rd, or middle element. The dogleg assembly is so called due to one bend element situated in a rotated clockwise manner from the transverse support assembly and the other rotated in a counter-clockwise manner from that same assembly. A similar embodiment omits the dogleg. Device 30 acts mechanically in response to an applied approximately vertical force in a similar fashion to Device 20.

FIG. 3 depicts a design very similar to that of FIG. 2 with 5 torsion and bend assemblies 300, 301, 302 along with a transverse support assembly 303. One major difference between this design and that shown in FIG. 2 is that the bend elements 304 are now at a 90-degree angle from the longitudinal axis of their torsion elements. This allows the torsion elements to be lengthened and thus endure enhanced mechanical resilience when loaded. The bend elements 304 are permanently angled down from the transverse support at an approximate angle of 45-degrees in a similar manner to the design of FIG. 2. The functionality and operational design with respect to a positioned bouldering pad is also similar to the embodiment of FIG. 2. The components are for example primarily of tubular geometry comprising PVC material.

One difference from the embodiment of FIG. 2 that is notable is the addition of spacers 305 and 306 between the individual torsion and bend assemblies 300, 301, 302. These spacers allow for varying the overall dimension along the transverse support assembly 303 axis as well as provide an avenue for tuning the stiffness along that same axis.

Transverse support assembly 303 is terminated on one end by a permanently attached cap 307 and a removable pin 308 so that the support can be removed from the assembly. This design incorporates a similar cross configuration 309 as cross 208 shown and functionally described previously for FIG. 2.

Figure 4A:
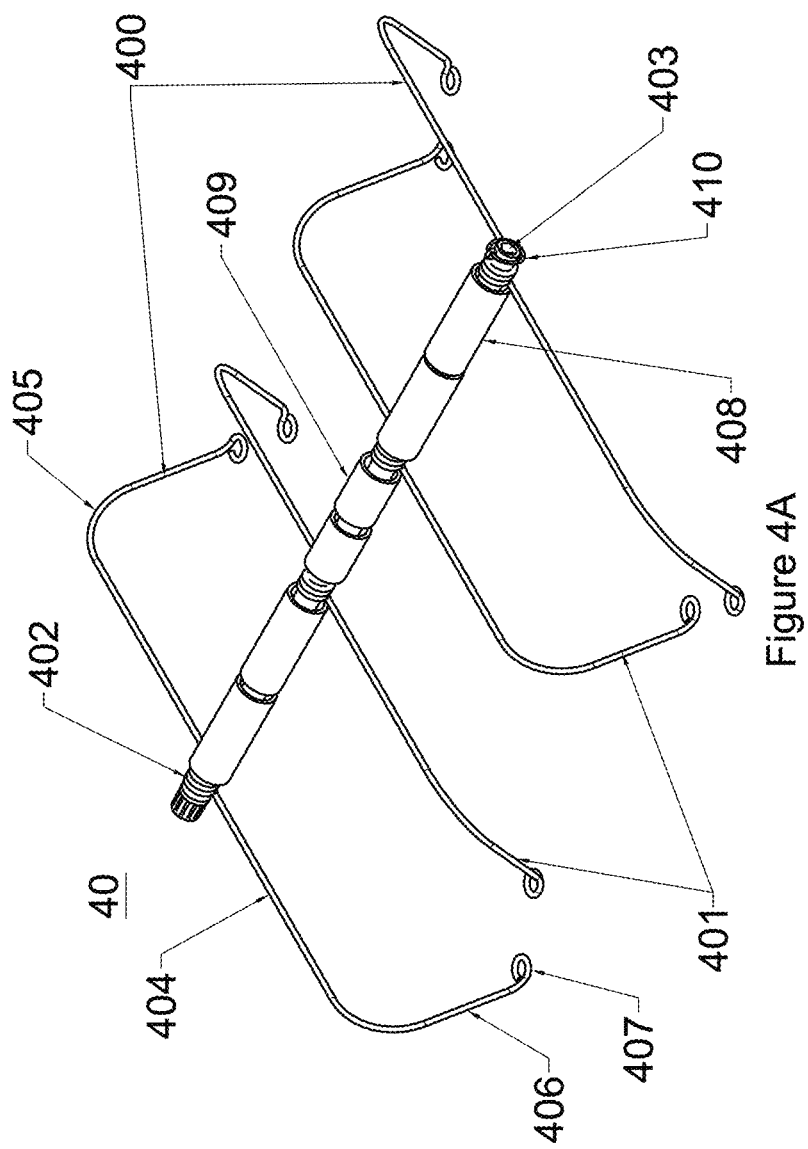
FIG. 4A is an isometric diagram of a crash absorption device having torsion rods connected to bendable legs.
Figure 4B:
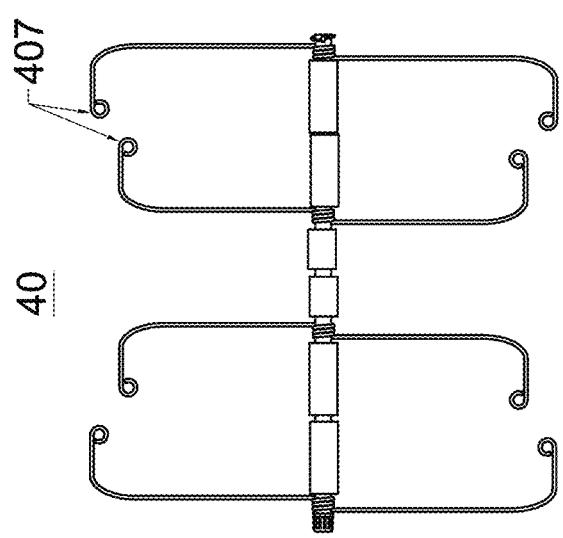
FIG. 4B is a top view of the device of FIG. 4A.
Figure 4C:
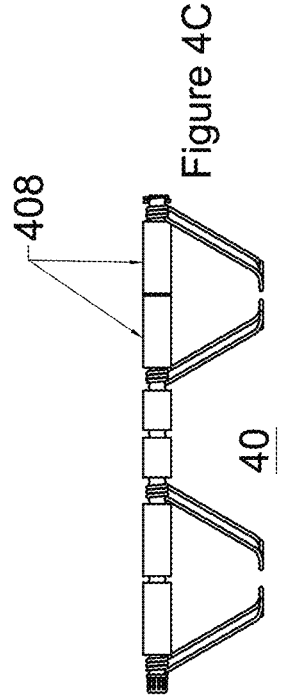
FIG. 4C is a side view of the device of FIG. 4A.

FIGS. 4A-4C show a crash absorption device 40 having torsion and bend assemblies 400 and 401 comprising torsion elements 404 connected to bend elements 406. In this embodiment torsion and bend assemblies 400 and 401 are integrally formed but they may be attached in other ways as shown in other figures herein.

The design shown in FIGS. 4A-4C comprises four unitary torsion and bend assemblies 400 and 401. These assemblies are formed of metal rods comprising spring steel or other resilient materials. The spring steel usually contains approximately 0.6-0.8% carbon with diameters typically 0.125" or greater.

Torsion and bend assemblies 400, 401, both long and short, are fabricated out of a single rod with a center double coil 402 and, mirrored across a center transverse support 403, primarily horizontal torsion elements 404 connected via an approximately 90-degree Bend, 405, to mirrored Bend Elements 406 that angle down and terminate in radiused end treatments 407. The end treatments are typically formed of rod that is bent to provide for enhanced slippage and gliding when resting upon a ground surface. Torsion and bend assemblies 400 and 401 differ in the length of the horizontal torsion elements 404, 406.

Further refinements of the invention are incorporated into this version; the spacing in between the four (4) torsion and bend assemblies 400, 401 comprise two (2) spacers 408, 409 each. There are now two long spacers 408 between the outer long torsion and bend assembly 400 and the inner short torsion and bend assembly 401. Between the two short torsion and bend assemblies 401 there are two shorter spacers 409. Transverse support 403 is held in place by removable clip pin 410, similar to pin 308 in FIG. 3.

The crash absorption device 40 of FIG. 4 incorporates four torsion and bend assemblies 400, 401 that are each fabricated from a single piece of resilient material, typically high carbon spring steel. Each torsion and bend assembly 400, 401 is secured to a transverse support 403 by inserting transverse support 403 through the coiled transverse apertures 402 proximally located near or at the center of torsion and bend assemblies 400, 401. The bend elements 406 are created by a radiused bend of approximately 90 degrees and inclined from the transverse element 404 at a pre-determined angle, shown here as approximately 50 degrees but this can vary depending on design. The four torsion and bend assemblies 400, 401 are kept at an approximate distance from each other using spacers 408, 409 appropriately placed. Device 40 acts mechanically in response to an applied approximately vertical force in a similar fashion to device 20.

Figure 5A:
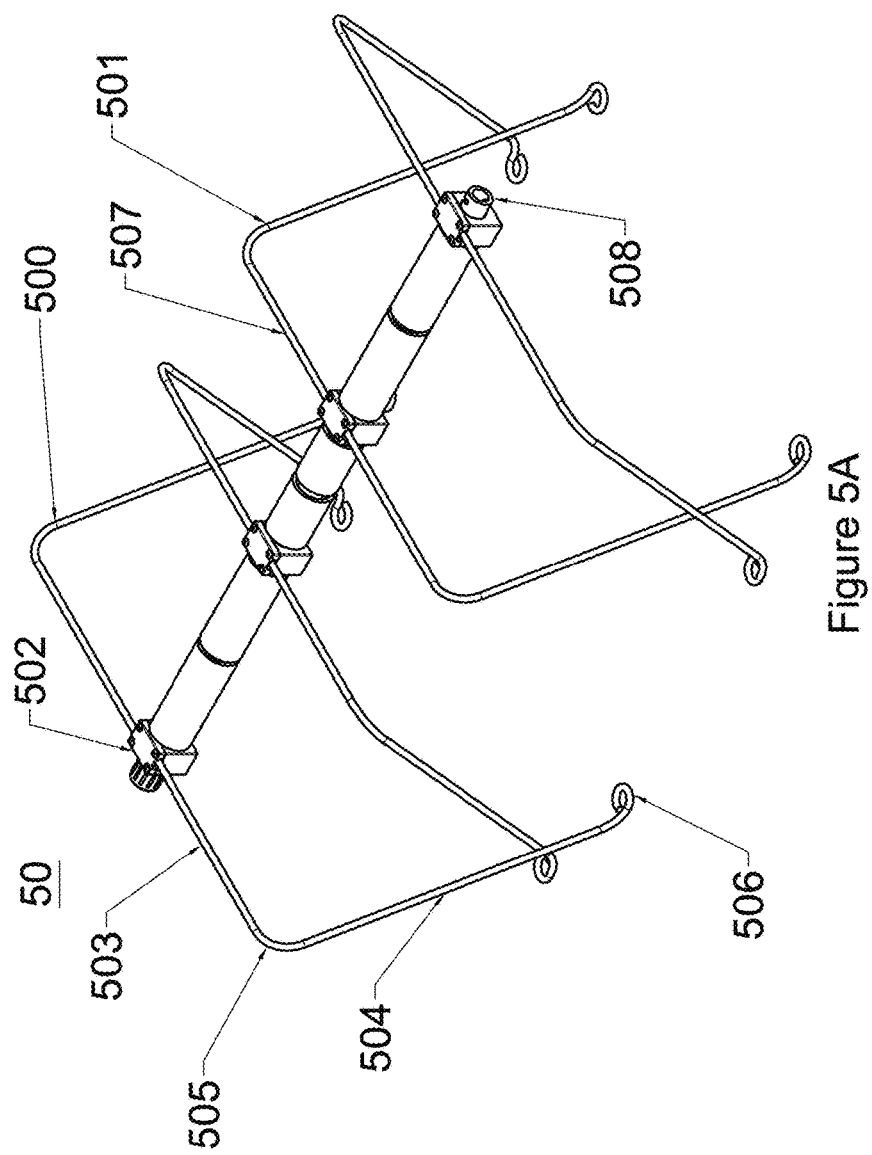
FIG. 5A is an isometric diagram of a crash absorption device having torsion rods connected to bendable legs.
Figure 5B:
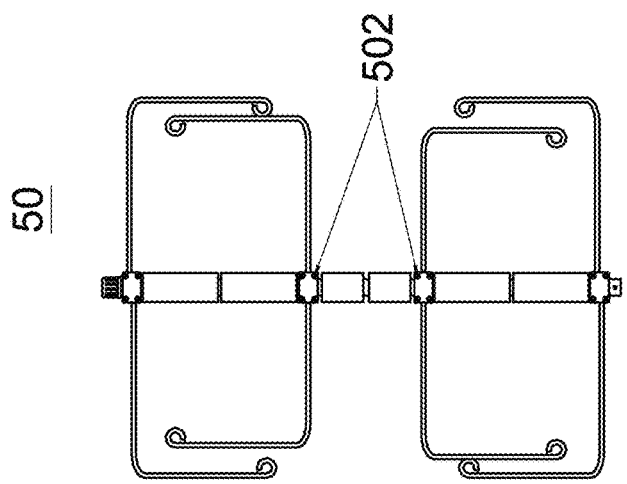
FIG. 5B is a top view of the device of FIG. 5A.
Figure 5C:
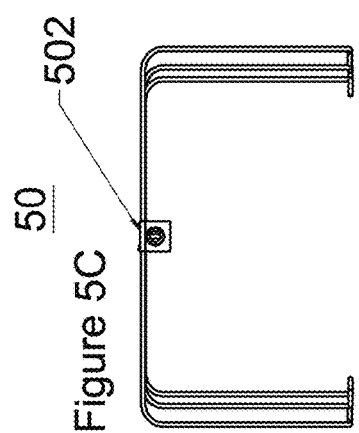
FIG. 5C is an end view of the device of FIG. 5A.

FIGS. 5A-5C show a crash absorption device 50 having divided torsion and bend assemblies 500, 501 comprising torsion rods 503, 507 connected to bendable legs 504. The design illustrated in FIGS. 5A-C is similar to that of FIG. 4 except that each torsion and bend assembly, long 500 and short 501, now comprise three (3) main components. Each torsion element 503, 507 comprises two halves and a connector 502 attaching the two halves.

For instance, long torsion and bend assembly 500 includes a center block 502 which mechanically connects mirrored long torsion elements 503 and bend elements 504. Long torsion element 503 is transitioned via an approximately 90-degree bend 505 to the angling down bend element 504. Bend element 504 terminates in end treatment 506.

Similarly, short torsion and bend assembly 501 has a center block 502, but short torsion element 507 has less length than long torsion element 503. Short torsion and bend assembly 501 similarly has an approximately 90-degree bend 505, an angling down bend element 504, and a terminating end treatment 506.

Bend elements 504 on both long and short torsion and bend assemblies 500, 501 angle down from transverse support assembly 508 at approximately 45-50-degrees.

Crash absorption device 50 incorporates fabricated blocks 502 to which four pairs of torsion and bend assemblies attach such that the torsion and bend assemblies are secured, and rotation around their axes is restricted. The eight torsion and bend assemblies 500, 501 can be disassembled from the blocks 502 by removing connectors that hold a cap onto the block base. Blocks 502 have clearance holes for insertion of transverse support assembly 508. Device 50 acts mechanically in response to an applied approximately vertical force in a similar fashion to device 20.

Figure 6A:
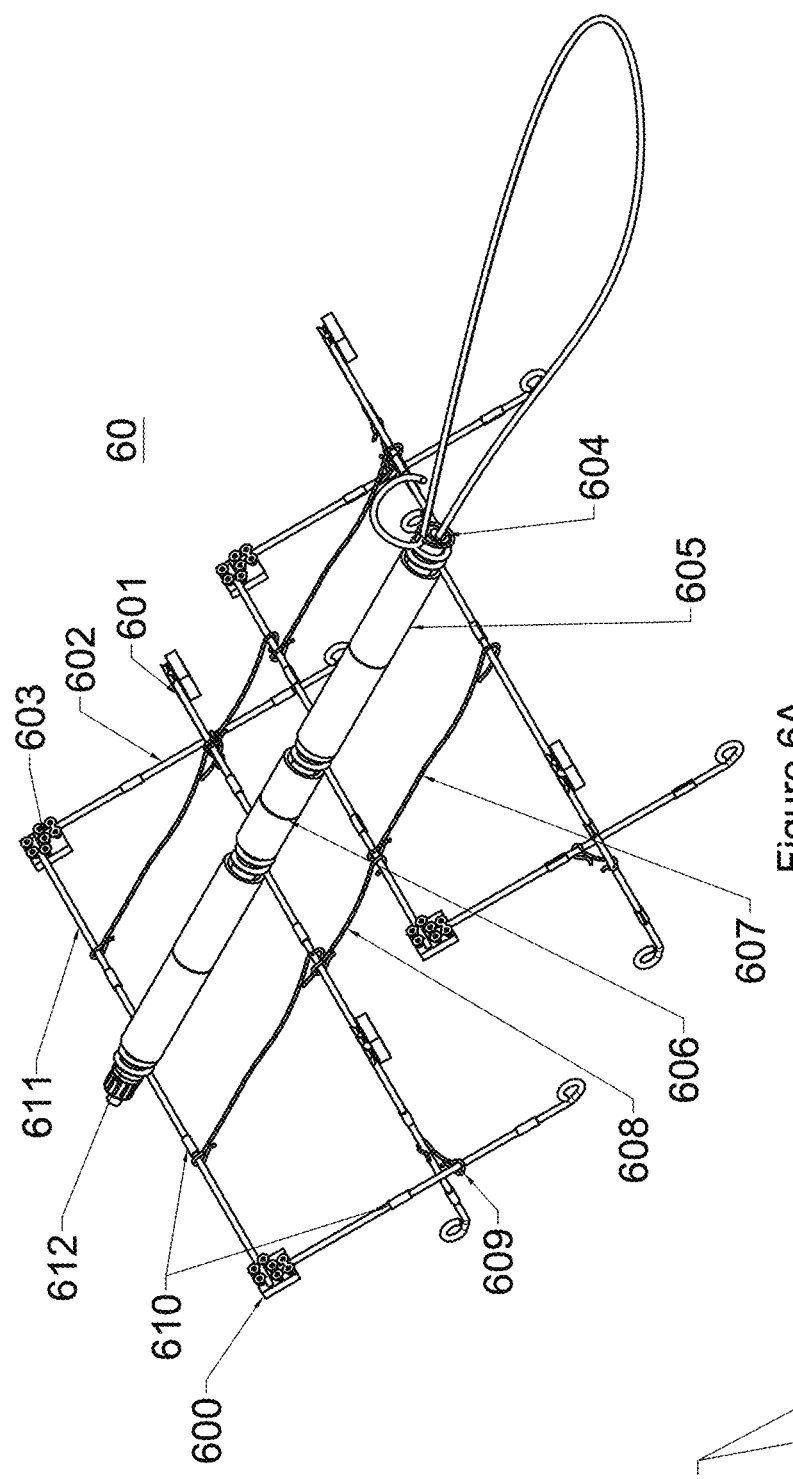
FIG. 6A is an isometric diagram of another crash absorption device having torsion rods connected to bendable legs.
Figure 6B:
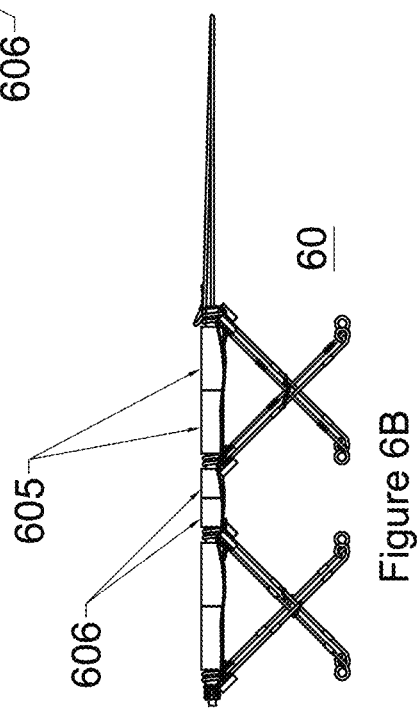
FIG. 6B is a side view of the device of FIG. 6A.

FIGS. 6A and 6B show crash absorption device 60. FIG. 6A is an isometric diagram of crash absorption device 60. FIG. 6B is a side view of device 60.

The design 60 shown in FIGS. 6A and 6B comprises four (4) torsion and bend assemblies 600 and 601. Each torsion and bend assembly 600, 601 comprises a bend element 602 connected via an elbow joint 603 to a torsion element 611 and mirrored about a central double coil 612 that is placed cylindrically about the Transverse Support 604. The bend, torsion and coil elements might comprise spring steel rod while the elbow joint is a machined aluminum part.

Long spacers 605 are placed between long and short torsion and bend assemblies 600, 601 and short spacers 606 are placed between short torsion and bend assemblies 601. The lengths of these can be varied to modify the mechanical resilience and response of the device.

Restraints 607 (between long and short torsion elements 503, 507), 608 (between short torsion elements 507) and 609 (between bend elements 504) assist in control of movement of torsion and bend assemblies 600, 601 with respect to each other. These restraints are constrained in their extent of motion by movement limiters 610. Restraints are typically formed of small diameter cabling and movement limiters are typically an adhesive material such as tape to increase the diameter of each element they are attached to.

Movement limiters 610 can be formed of adhesive tape, crimped malleable metal, or other materials and are in general affixed permanently in locations along torsion and bend assemblies 600, 601 such that they limit the movement of restraints 607, 608, 609 along the axes of their respective torsion and bend elements. Movement Limiters 610 maintain approximate locations of restraints 607, 608, 609 to aid in assembly, the collapse process and configuration, and aid in maintaining connectivity of disparate components in the stowage configuration.

Figure 7:
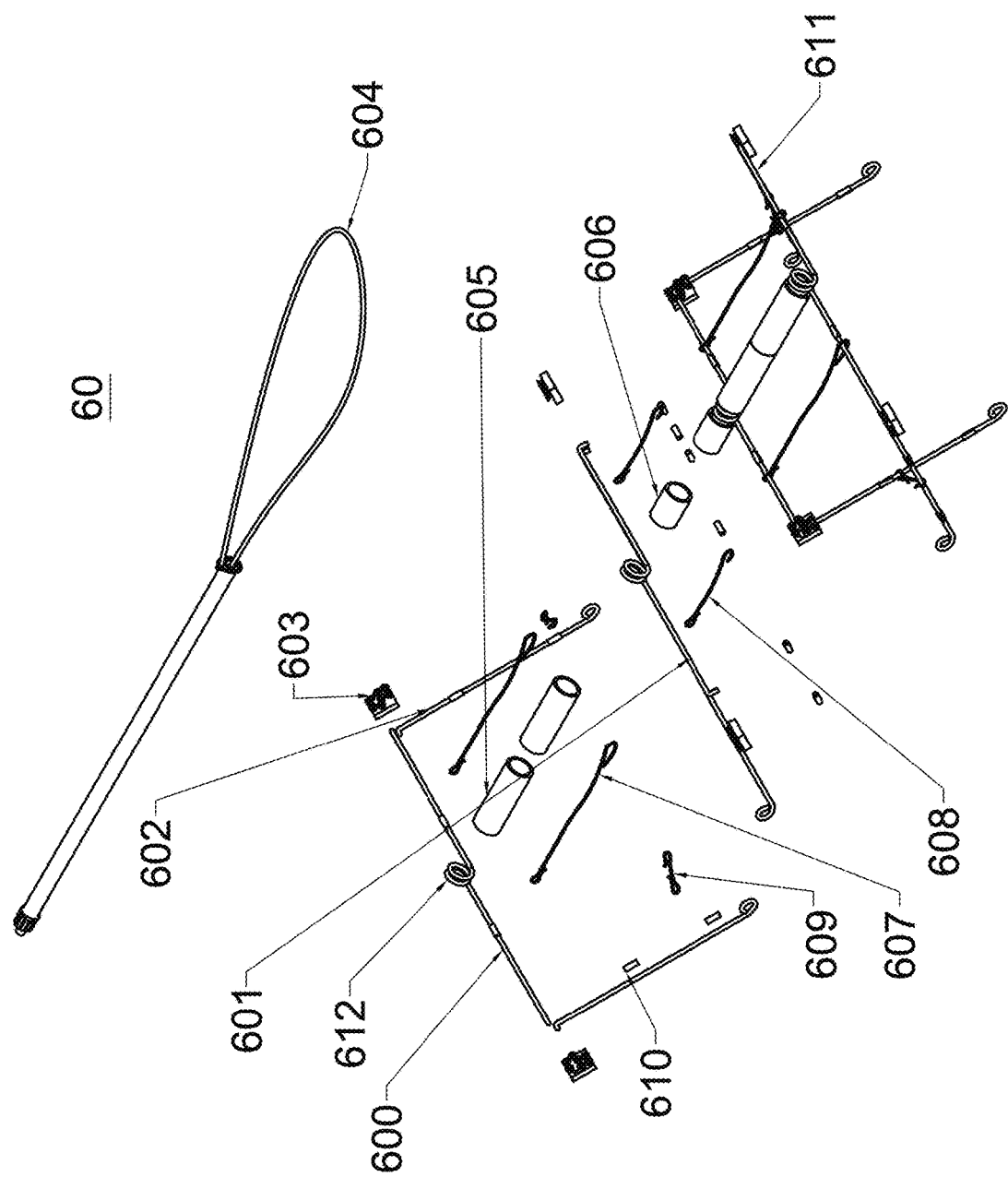
FIG. 7 is an exploded view of the crash absorption device of FIG. 6A.

FIG. 7 is a partially exploded isometric diagram of crash absorption device 60. The exploded design shown in FIG. 7 comprises four (4) connected torsion and bend assemblies 600 and 601. Assemblies 600, 601 comprise bend elements 602 connected via elbow Joints 603 to torsion elements 611 and mirrored about central double coil 612 that is placed cylindrically about transverse support 604. The bend, torsion and coil elements comprise spring steel rod while the elbow joint is a machined aluminum part.

Long spacers 605 are placed between long and short torsion and bend assemblies and short spacers 606 are placed between short torsion and bend assemblies. The lengths of these can be varied to modify the mechanical resilience and response of the device.

Restraints 607, 608 and 609 assist in control of movement of torsion and bend assemblies 600, 601. Restraints 607, 608 and 609 are constrained in their extent of motion by movement limiters 610. Restraints 607, 608 and 609 are typically small diameter cabling and movement limiters 610 are typically an adhesive material.

FIG. 8 is a schematic isometric diagram showing an example of torsion element 611 in more detail. Torsion element 611 comprises spring steel rod of a diameter typically 1/8" or greater. Torsion element 611 is mirrored across double coil 612 and terminates in stubs 802 at approximately 90-degree angles to the longitudinal axes of torsion element 611. Stubs 802 are approximately 0.50 inches long. Movement limiters 610 comprising adhesive material can be attached at various locations along torsion element 611 as needed.

FIG. 9A is a schematic isometric diagram showing an example of bend element 602 in more detail. Element 602 comprises spring steel rod of a diameter typically 1/8" or greater. Element 602 terminates in stub 901 at approximately 90-degree angles to the longitudinal axes of torsion element 611 and at the other end, end treatment 407. Stubs 901 are approximately 0.50 inches long and end treatments 407 are typically a rounded geometry of approximately 1/2" radius or other contoured shape. Movement limiters 610 comprising adhesive material can be attached at various locations along bend elements 602 as needed.

An alternative bend element design that retains the integral elbow transition from a torsion element to a bend element as in device 40 and device 50 is the bend element with integral elbow 902 shown in FIG. 9B. This alternative element 902 comprises an approximately 90-degree stub 901 connecting to short extension 904 that leads to elbow portion 903 which creates an approximately 90 degree bend to the continuation of 902. Bend element with integral elbow 902 has at its terminal end the end treatment 407 as in bend element 602 of FIG. 9A. Bend element with integral elbow 902 comprises typically 1/8" diameter or larger spring steel.

FIG. 10A is a schematic isometric diagram showing elbow joint assembly 603 in use. The detail of elbow joint assembly 603 is shown in FIG. 10B.

The main components of elbow joint assembly 603 itself are elbow joint block 1000, fasteners 1001, fastener holes 1002, torsion element assembly stub clearance hole 1003 and bend element assembly stub clearance hole 1008. Joint assembly 603 comprises the main components combining torsion element assembly 611 and bend element assembly 602.

Torsion element stub 802 inserts into torsion element assembly stub clearance hole 1003 and is held in place by several of fasteners 1001. Similarly, bend element stub 901 is inserted into bend element assembly stub clearance hole 1008 and held in place by several fasteners 1001. Fasteners 1001 are typically threaded bolts that thread into appropriately sized and matching threaded Fastener Holes 1002.

Also shown on FIG. 10A are the attaching flexible cord 1010, attaching buckle 1011 and the overhand knot 1012. These components are used to attach the device to appropriate connection points on a crash pad to maintain the device's proximity to the crash pad during use. Alternatively, the device may be incorporated into an appropriate design of an integrated crash absorption system. For example, the device could be permanently attached to a crash pad.

Figure 10C:
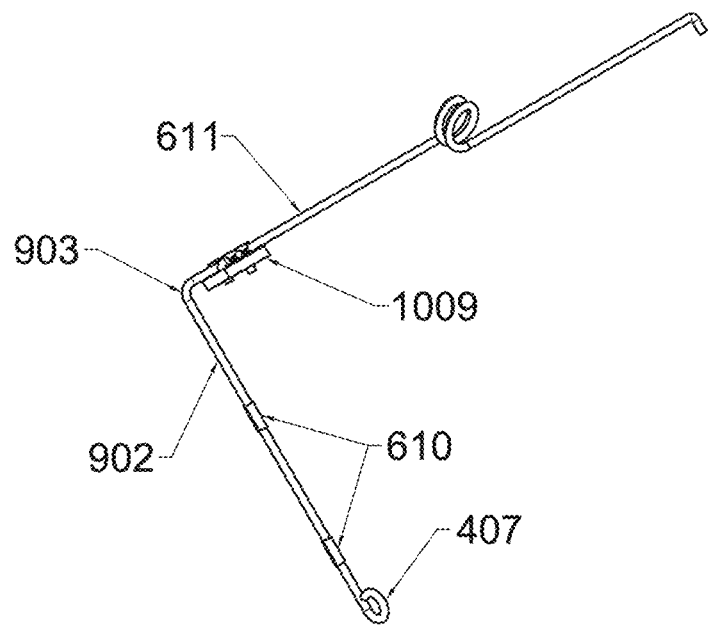
FIG. 10C shows an alternate joint assembly.

FIG. 10C shows an alternate a joint assembly 1009 that can be used in place of elbow joint 603. When used in conjunction with joint plate 1009, bend element with integral elbow 902 can be connected to torsion element 611 as illustrated in FIG. 10C.

Figure 10D:
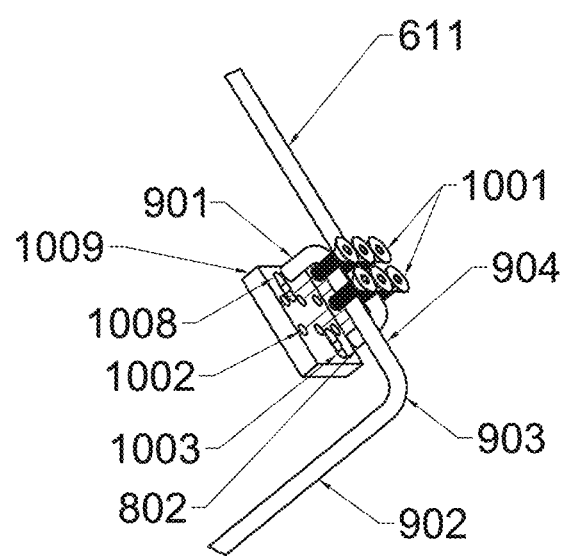
FIG. 10D shows the alternate joint assembly in more detail.

FIG. 10D shows alternate joint assembly 1009 in more detail. As detailed in FIG. 10D, joint plate 1009 mechanically connects torsion element 611 and bend element 602 having integral elbow 902 via insertion of stubs 901 and 802 into their respective stub clearance holes 1008 and 1003 and then by securely inserting and tightening fasteners 1001 into their respective matching fastener holes 1002. Joint plate 1009 is typically formed of an aluminum material.

FIG. 11 is a schematic isometric diagram showing transverse support assembly 604 in more detail. It comprises transverse support rod 1100, end cap 1101, pin 1102, pin clearance holes 1105, flexible cord 1103, cord end treatment 1104, and cord end loop 1106. Note that transverse support rod 1100 may comprise, for example, a single piece, two or more detachable pieces, or two or more pieces configured to telescope. The latter two configurations save space as a single piece transverse support rod 1100 generally cannot be shortened.

Transverse support rod 1100 and end cap 1101 can comprise PVC materials of typically Schedule 40 or Schedule 80 size. End cap 1101 is typically glued onto transverse support rod 1100. Flexible cord 1103 can be rope, cable, or webbing of appropriate size to be inserted axially through transverse support rod 1100. At one end of flexible cord 1103 end treatment 1104 is applied, typically a knot, after flexible cord 1103 is inserted through a hole in end cap 1101. End treatment 1004 secures cord 1103 at end cap 1101.

At the other end of flexible cord 1103 a cord end loop 1106 can be fitted around pin 1102 to secure pin 1102 to flexible cord 1103. Pin 1102 is fitted through pin clearance hole 1105.

FIG. 12A is a side view illustrating integral bending assemblies 400 in their unbent position. FIG. 12B is a side view illustrating integral bending assemblies 400 in their bent position. FIG. 12C is an isometric view showing integral bending assemblies 400 in their unbent position.

FIG. 12A illustrates a sectioned representation of the invention showing Undeflected Bend Assemblies 400 as inserted through a portion of transverse support 403 and resting on ground level 1205 (dashed line). There is no load applied to the section in FIG. 12A so there is no deflection of any parts.

When an applied load 1204 vertically presses down on the section as shown FIG. 12B, transverse support 403 transmits the force to double coil 402 which then transmits the load to bend assemblies 400. Transverse support 403 along with the upper portion of bend assembly 400 move groundward from starting height 1203 to end Height 1206 traversing a total distance 1202. Bend assemblies 400 react by bending as shown by deflected bend assemblies 400 in a bent configuration 1207. Additionally, end treatments 407 slide along the ground horizontally.

FIG. 13A is a side view illustrating a connected torsion element assembly 600 (see FIGS. 6 and 7) in its unloaded position. FIG. 13B is a side view illustrating connected torsion element assembly 600 in its loaded position 1305. FIG. 13C is an isometric view illustrating connected torsion element assemblies 600 in their loaded (back) and unloaded (front) positions.

FIGS. 13A-C illustrate the rotation of torsion element assembly 611 due to vertical deflection 1304 of the invention for example by the vertical movement of transverse support 604. Initial angle 1302 between bend element 602 and transverse support assembly 604, approximately 45 degrees, changes after vertical movement to a smaller final angle 1303, approximately 15 degrees. This is accomplished by both bending of bend element assembly 600 and twisting of torsion element 611.

Since angle 1302 of torsion element assembly 600 has changed to angle 1303, this twisting creates a mechanical state of torsion.

FIG. 14A is an isometric view of a crash absorption device 60 in a collapsed configuration. FIG. 14B is a view of the collapsed configuration from the top. FIG. 14C is a view of the collapsed configuration from the end.

Figure 15A:
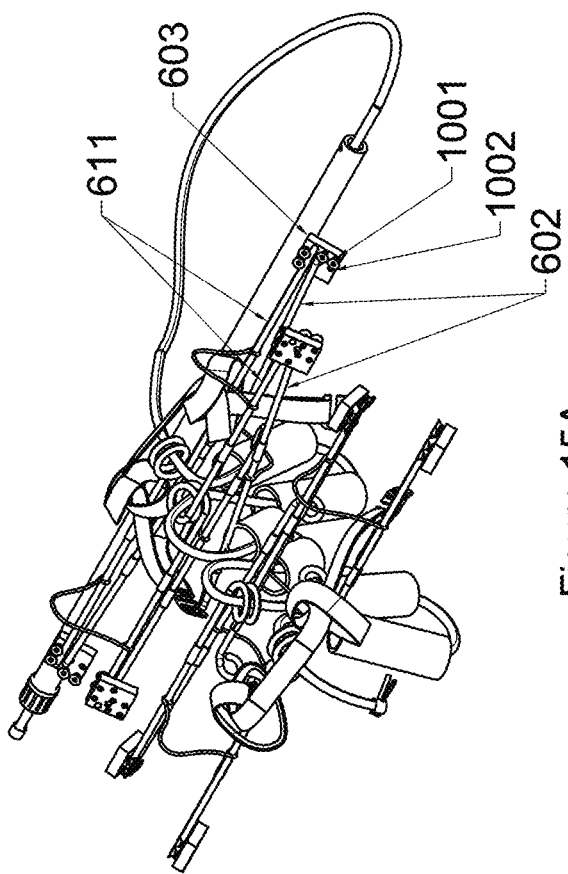
FIG. 15A is an isometric view of a crash absorption device in a folded stowed configuration.
Figure 15B:
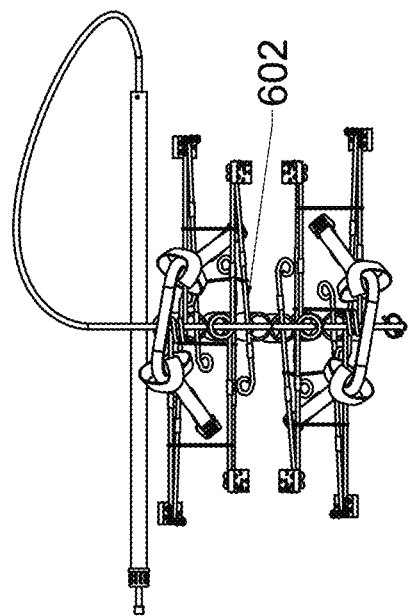
FIG. 15B is a view of the folded stowed configuration from the side.
Figure 15C:
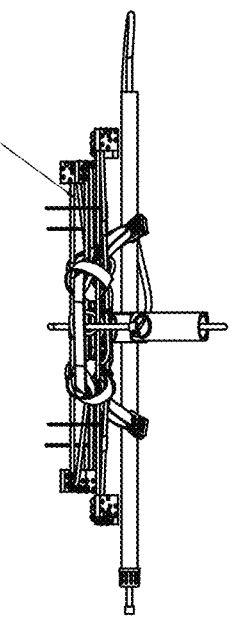
FIG. 15C is a view of the folded stowed configuration from the end.

FIGS. 14A-C illustrate crash absorption device 60 in a collapsed but not stowed configuration. Refer to FIGS. 15A-C for the stowed configuration.

In the collapsed configuration of FIGS. 14A-C, pin 1102 has been removed from pin clearance holes 1105 on the end of transverse support 604 (see FIG. 11). Flexible cord 1103 has been pulled through transverse support rod 1100 such that torsion and bend assemblies long and short, 600 and 601, can be placed on top of each other. To do so, short and long Spacers 606 and 607, are folded parallel as a pair as shown. In placing torsion and bend assemblies as a stack, restraints 607 between long and short Torsion elements 611 and restraints 608 between short torsion elements flex to allow close stacking of the components. Restraints 607, 608 are typically formed of a flexible material, small diameter steel cabling for instance.

The collapsed configuration of FIG. 14A-C is important for reducing the size of the invention for handling while moving from one activity location to another one nearby or for more conveniently carrying from a mode of transportation, car for instance, to an outside location. Since the collapsed configuration maintains connectivity to all parts it can be quickly and easily re-configured into the use configuration.

FIG. 15A is an isometric view of a crash absorption device in a stowed configuration. FIG. 15B is a view of the stowed configuration from the top. FIG. 15C is a view of the stowed configuration from the end.

FIGS. 15A-C illustrate crash absorption device 1400 in the stowed configuration. In this configuration the invention has been further reduced in overall size from the collapsed configuration shown in FIG. 14A-C. To do this, some of fasteners 1001 are removed from their fastener holes 1002 to allow bend elements 602 to be rotated into a quasi-parallel arrangement adjacent to torsion elements 503, 507. While in this configuration, bend elements 602 may either stay connected to elbow joint 603 or may be removed.

The stowed configuration further reduces the overall size of device 60 from that of the collapsed configuration. The invention's various components are designed such that when it is in the stowed configuration it can be conveniently and efficiently packaged for long range shipment and for stowage in conventional types of baggage such as carryon baggage on aircraft, rail, etc.

FIGS. 16A-C show a crash absorption device 70 having three torsion and bend elements. The legs are angled obliquely down.

Device 70 comprises horizontal torsion elements and obliquely situated bend elements similar to Device 30. The difference is that Device 70 is comprised of three elements, two outer torsion and bend elements 1600 and one middle dogleg torsion and bend element 1601. The outer elements are separated from the inner elements by spacers 1602. The outer elements and the spacers are placed onto a transverse rod 1603.

Terms such as "up", "down", "distal", "proximate", "horizontal", "vertical", "clockwise", "counterclockwise", etc. are used for convenience in describing the drawings. Those skilled in the art will appreciate that various configurations and placements of the device and the elements fall within the spirit of the device.

While the exemplary preferred embodiments of the present invention are described herein with particularity, those skilled in the art will appreciate various changes, additions, and applications other than those specifically mentioned, which are within the spirit of this invention. For example, torsions rods may be formed integrally with legs rather than using a joint assembly. The apparatus may be separate or may be integrated into another crash device, may be comprising materials other than those described, may be comprising additional torsion/bend elements, and may be comprising such elements of other geometries.

What is claimed is:

1. Apparatus for absorbing impacting energy from a downward impact comprising:
   an elongated transverse support assembly extending in a distal-proximal direction;
   four torsion elements having longitudinal axes, each torsion element attached to the transverse support assembly and extending to either side of the transverse support assembly along its longitudinal axis, such that the longitudinal axes of the torsion elements extend nonparallel to the distal-proximal direction;
   a pair of bending elements spaced apart and attached to each torsion element, the bending elements extending downward from their attached torsion element at a slant with respect to the distal-proximal direction;
   wherein the torsion elements absorb a downward impacting load primarily by twisting, and the torsion elements further untwist to an unloaded state when the impacting load is removed; and wherein the bending elements further absorb the impacting load by bending, and unbend to an unloaded state when the impacting load is removed.

2. The apparatus of claim 1 wherein each torsion element is formed integrally with its attached bending element.

3. The apparatus of claim 1 further comprising a discrete connector attaching each torsion element to its attached bending element.

4. The apparatus of claim 1 wherein the torsion elements are a single piece.

5. The apparatus of claim 4 wherein each torsion element forms a coil that absorbs the impacting load by twisting and by allowing each torsion element to twist further.

6. The apparatus of claim 1 wherein the torsion elements comprise two halves and a connector attaching the two halves.

7. The apparatus of claim 1 wherein each torsion element and its attached bending elements are formed of high-carbon steel.

8. The apparatus of claim 1 wherein the transverse support assembly includes a transverse rod and spacers inserted onto the transverse rod, and wherein the spacers maintain spacing between the torsion elements, wherein the spacers are discrete from the torsion elements.

9. The apparatus of claim 1 wherein the transverse support assembly includes a transverse rod, wherein the torsion elements form helical coils, and wherein the helical coils are inserted onto the transverse rod.

10. The apparatus of claim 8 wherein the torsion elements form openings, the apparatus configured to be folded into a collapsed configuration by removing the transverse rod from the torsion element openings and the spacers, and folding the spacers with respect to each other.

11. The apparatus of claim 10, further comprising a cable inserted through the torsion element openings and the spacers and configured to stay inserted through the torsion element openings and the spacers when the transverse rod is removed from the torsion element openings and the spacers such that a sequential ordering of components is maintained during assembly and disassembly processes.

12. The apparatus of claim 11 configured to be folded into a stowed configuration by folding the bending elements with respect to their attached torsion elements.

13. The apparatus of claim 1 wherein one of the torsion elements and an associated pair of bending elements are in a dogleg configuration wherein one of the associated bending elements angles in the proximal direction and the other associated bending element angles in the distal direction.

14. The apparatus of claim 1 further comprising flexible restraints that maintain apparatus rotation, proximity and sequence during an assembly process and during a disassembly process.

15. The apparatus of claim 14 further comprising movement limiters that allow a constrained extent of motion of the restraints.

16. The apparatus of claim 1 further comprising components configured to attach a crash pad.

17. Apparatus for absorbing downward impacting energy comprising:
   an elongated transverse support assembly extending in a distal-proximal direction;
   three torsion elements, each attached to the transverse support assembly and extending longitudinally to either side of the transverse support assembly, nonparallel to the distal-proximal direction;
   a pair of bending elements spaced apart and attached to each torsion element, the bending elements extending downward from their attached torsion element at a slant with respect to the distal-proximal direction;
   wherein the torsion elements absorb downward impacting load primarily by twisting, and the torsion elements further untwist when the impacting load is removed; and wherein the bending elements absorb the impacting load by bending and further unbend when the impacting load is removed.

18. The apparatus of claim 17 wherein one of the torsion elements and an associated pair of bending elements are configured in a dogleg configuration wherein one of the associated bending elements angles in the proximal direction and the other associated bending element angles in the distal direction.

19. The apparatus of claim 18 wherein each torsion element forms a coil that absorbs part of the downward impact by twisting and by allowing each torsion element to twist further.

20. The apparatus of claim 10 wherein the torsion element openings comprise helical coils.

21. The apparatus of claim 1 wherein the torsion elements form clearance holes and the transverse support assembly is inserted into the clearance holes such that the torsion elements assembly can rotate and translate with respect to the transverse support assembly.

* * * * *